United States Patent
Llerena

[19]

[11] Patent Number: 5,838,126
[45] Date of Patent: Nov. 17, 1998

[54] METHOD AND APPARATUS FOR OPENING OR CLOSING A DOOR BY MEASURING THE INSTANTANEOUS VOLTAGE AND CURRENT IN AN ASSOCIATED MOTOR

[75] Inventor: Laurent Pierre Edouard Llerena, Saint Avertin, France

[73] Assignee: Faiveley Transport, Saint Denis, France

[21] Appl. No.: 651,493

[22] Filed: May 22, 1996

[30] Foreign Application Priority Data

May 22, 1995 [FR] France ............................. 95 06034

[51] Int. Cl.⁶ ............................................. H02P 3/00
[52] U.S. Cl. ........................ 318/286; 160/293.1; 49/26
[58] Field of Search ................................ 318/280–286, 318/466–472, 650; 49/26, 28, 29, 138; 160/291, 292, 293.1

[56] References Cited

U.S. PATENT DOCUMENTS

| | | | |
|---|---|---|---|
| 4,533,901 | 8/1985 | Lederle | 49/28 |
| 4,563,625 | 1/1986 | Kornbrekke et al. | 318/603 |
| 4,578,763 | 3/1986 | Jones et al. | |
| 4,855,653 | 8/1989 | Lemirande | 318/282 |
| 4,900,994 | 2/1990 | Mizuta | 318/283 |
| 5,230,179 | 7/1993 | Richmond et al. | 49/28 |
| 5,278,480 | 1/1994 | Murray | 318/626 |
| 5,334,876 | 8/1994 | Washeleski et al. | 307/10.1 |
| 5,483,135 | 1/1996 | Parks | 318/469 |
| 5,559,375 | 9/1996 | Jo et al. | 307/10.1 |

FOREIGN PATENT DOCUMENTS

| | | |
|---|---|---|
| 0 415 655 | 3/1991 | European Pat. Off. |
| 0 578 062 | 1/1994 | European Pat. Off. |
| 2 221 769 | 2/1990 | United Kingdom |

*Primary Examiner*—Jonathan Wysocki
*Attorney, Agent, or Firm*—Young & Thompson

[57] ABSTRACT

A method of electronically controlling the opening and/or closing of a door by a DC motor. An instantaneous position of the door is determined. The voltage across the terminals of the DC motor or the current flowing through the windings of the motor is regulated as a function of the determined instantaneous position. The above two operating steps are repeated at a predetermined time intervals for controlling the displacement of the door. To determine the instantaneous position of the door, the instantaneous voltage across the terminals of the motor is measured, and the instantaneous current flowing through the windings of the motor is measured. The displacement of the door during the present time interval is computed as a function of the measured instantaneous voltage and current values and as a function of known and constant values for the back-emf and for the internal resistance of the motor. The computed displacement is added to the value of the instantaneous position as determined during the preceding time interval to obtain the determined instantaneous position of the door at the end of the present time interval.

11 Claims, 3 Drawing Sheets

METHOD AND APPARATUS FOR OPENING OR CLOSING A DOOR BY MEASURING THE INSTANTANEOUS VOLTAGE AND CURRENT IN AN ASSOCIATED MOTOR

The invention relates to an electronic control method for opening and/or closing a door by means of a DC motor, to apparatus for implementing such a method, and also to a door including such apparatus.

BACKGROUND OF THE INVENTION

The invention applies more particularly to control methods and apparatuses for electrical doors in rail rolling stock or doors for the edges of station platforms. However, it can be applied to other types of doors, such as doors for elevators (lifts) or car parks, providing they are of a structure in which movement of the door is controlled by means of a DC motor with the speed and the torque of the motor being regulated as a function of the position of the door.

an electronic control apparatus is known for opening and/or closing a door by means of a DC motor. In general, such an apparatus makes it possible to control the door electronically as follows:

the instantaneous position of the door is determined by means either of an electromechanical detector or by means of an optical encoder mounted on the shaft of the motor; and the voltage across the terminals of the DC motor or the current flowing through the windings of the motor is regulated as a function of the determined instantaneous position.

With an electromechanical detector, the detector delivers a signal corresponding to the door passing through a predetermined position. Position measurement is therefore simple since it does not require any computation. However, that type of apparatus provides only predetermined door positions in application of preestablished settings, and any change of the settings entails complicated modification since it requires mechanical action to be taken on the detector.

With an optical encoder, no special handling is required in order to use it, and since it has few mechanical parts the apparatus remains much more reliable. However, it constitutes a sophisticated detector insofar as the information it delivers requires subsequent data processing to be performed in order to obtain information equivalent to that from a detector. An optical encoder thus constitutes a device that is relatively expensive and that gives information that is very accurate, which is not always essential in applications such as controlling doors.

The state of the art in controlling electrical motors is also illustrated by the following documents:

American patent U.S. Pat. No. 4,378,517 relates to a method and to apparatus for applying power control to an electric motor. However, that apparatus makes use of a tachometer to measure the speed of the motor, which requires the use of an additional electromagnetic element that can give rise to errors of measurement accuracy and that does not improve the reliability of the apparatus.

American patents U.S. Pat. No. 4,779,031 and U.S. Pat. No. 5,033,088 relate to a servo-motor system (motor-controller-sensor) in which all of the elements are redefined in order to make the system more robust, more compact, and more reliable. However, that apparatus requires the use of an encoder for computing position and speed, which implies an additional electromechanical element.

American patent U.S. Pat. No. 5,093,892 relates to a speed control system for a motor. That apparatus is used essentially for controlling the motor of a sewing machine to compensate for variations in load. There again, the real speed of rotation of the motor is measured by a sensor.

All of those apparatuses thus suffer from the drawback of requiring the presence of an additional element such as a detector or a sensor in order to be able to control a DC electric motor, to the detriment of good reliability and at greater cost. In addition, those apparatuses enable detection to be performed with accuracy that is considerably greater than that required in the context of controlling a door.

OBJECTS AND SUMMARY OF THE INVENTION

The invention therefore seeks to mitigate those drawbacks.

An object of the invention is to provide an electronic control method for opening and/or closing a door by means of a DC motor that is simpler, requiring fewer measurement elements so as to reduce the risks of breakdown and thus making it possible to be more compact, with this being done at lower accuracy since in the application of controlling a door, such accuracy is not necessary.

Another object of the invention is to provide apparatus enabling such a method to be implemented and capable of being adapted and adjusted with respect to predetermined positions much more easily than existing systems.

To this end, the invention provides a method of electronically controlling the opening and/or closing of a door by means of a DC motor, the method comprising the following operating steps:

an instantaneous position of the door is determined;

the voltage across the terminals of the DC motor or the current flowing through the windings of the motor is regulated as a function of the determined instantaneous position; and the above two operating steps are repeated at a predetermined time intervals for controlling the displacement of the door.

So determine the instantaneous position of the door, the instantaneous voltage across the terminals of the motor is measured, and the instantaneous current flowing through the windings of the motor is measured. The displacement door of during the present time interval is computed as a function of the measured instantaneous voltage and current values and as a function of known and constant values for the back-emf and for the internal resistance of the motor. The displacement is added to the value of the instantaneous position as determined during the preceding time interval to obtain the determined instantaneous position of the door at the end of the present time interval.

Thus, all of the information given by the motor is made use of for controlling the door by determining the position thereof without using an additional measuring or detection instrument. Although this method gives rise to results that are less accurate than those from known devices, such accuracy is not necessary for controlling a door, so position determination can be performed in a manner that is much simpler and more reliable.

A particular application of the method lies in providing control by means of a permanent magnet DC motor.

The invention also provides apparatus for electronically controlling the opening and/or closing of a door by means of a DC motor, and suitable for implementing the method as defined above, the apparatus comprising:

means for determining an instantaneous position of the door; and means for regulating the voltage across the terminals of the DC motor or the current flowing through the windings of the motor as a function of the determined instantaneous position.

The means for determining the instantaneous position comprise means for measuring the instantaneous voltage across the terminals of the motor, means for measuring the instantaneous current flowing through the windings of the motor, means for computing the displacement of the door performed during the present time interval as a function of the measured instantaneous voltage and current values and as a function of known and constant values for the back-emf and the internal resistance of the motor, and summing means for adding the displacement to the instantaneous position value determined during the preceding time interval to obtain the determined instantaneous position of the door at the end of the present time interval.

Finally, the invention provides an electronically controlled door including at least one leaf suitable for being displaced along guide means by mechanical drive means driven by a DC motor, the door including control apparatus as defined above.

BRIEF DESCRIPTION OF THE DRAWINGS

Other characteristics of the invention appear from the following description of an embodiment given purely by way of example and with reference to the accompanying drawings, in which.

MORE DETAILED DESCRIPTION

The electronic elements contained in the apparatus of the invention are known individually or are available to the person skilled in the art. They are therefore merely represented diagrammatically in the figures and they are not described in greater detail.

The control method of the invention is designed for use in providing electronic control for opening and/or closing a door 1 by means of a DC motor 2.

Figure 1:
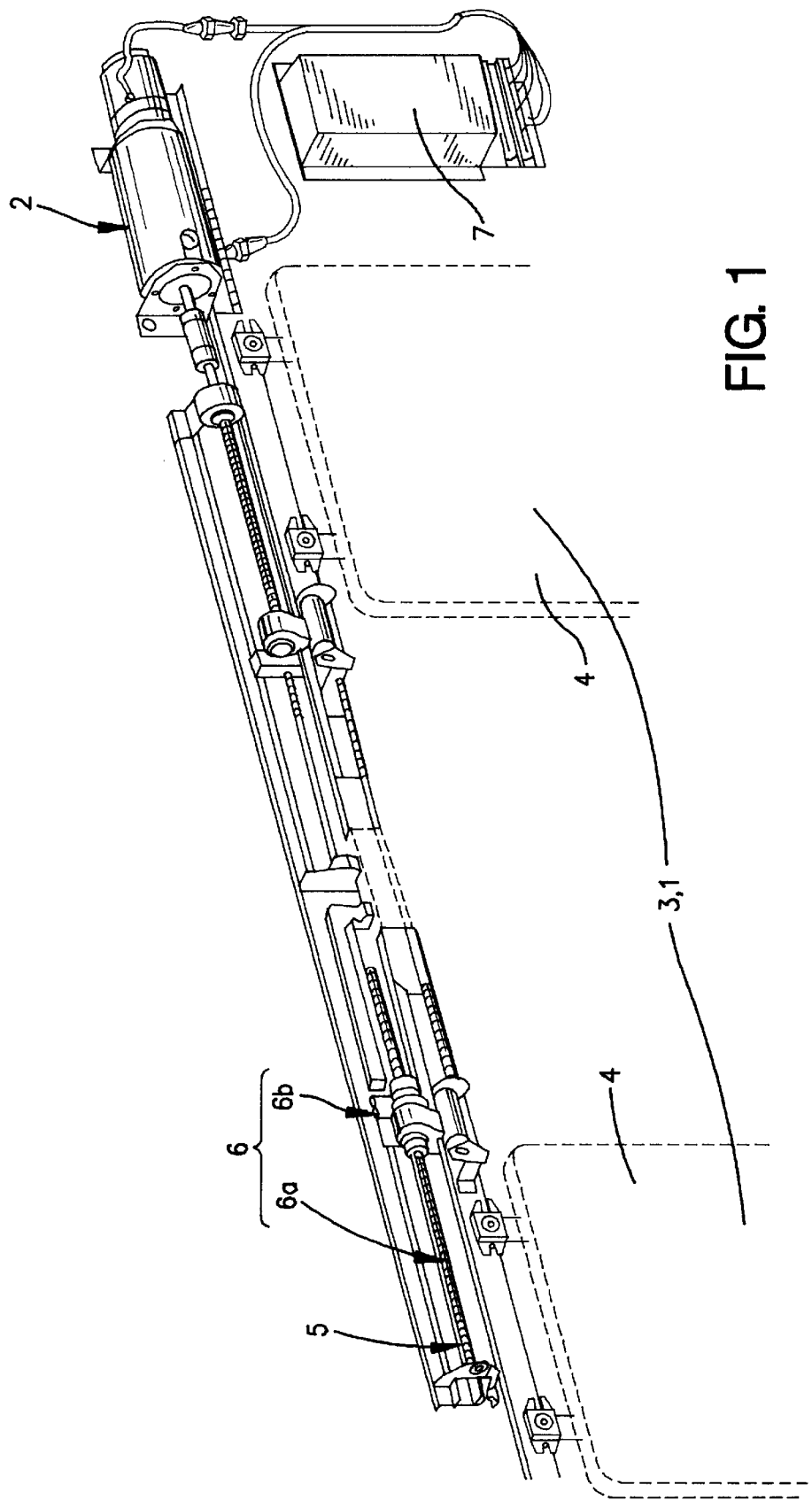
FIG. 1 is a diagram of a door controlled by the control method of the invention.
Figure 2:
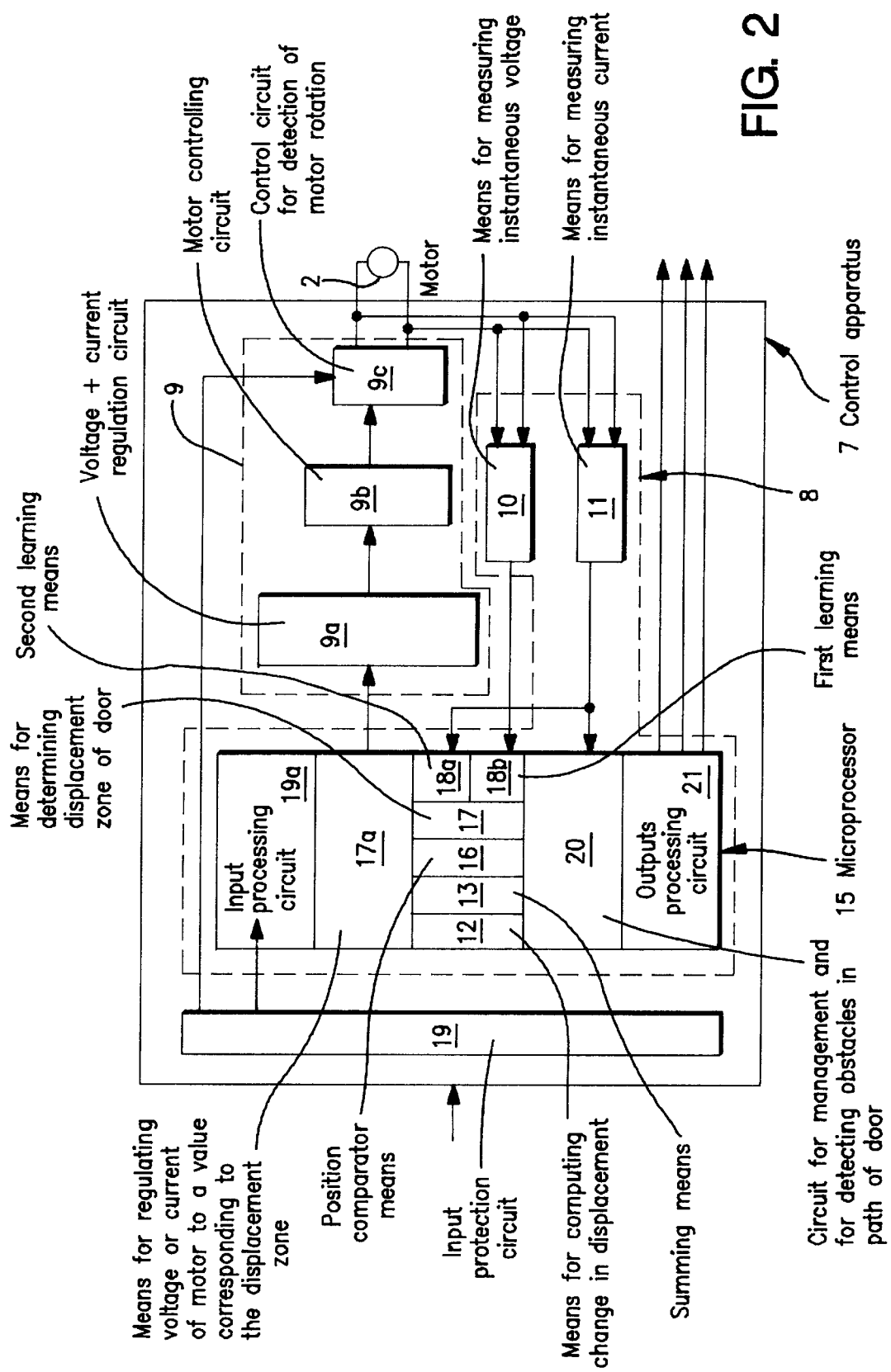
FIG. 2 is a block diagram of control apparatus of the invention.
Figure 3:
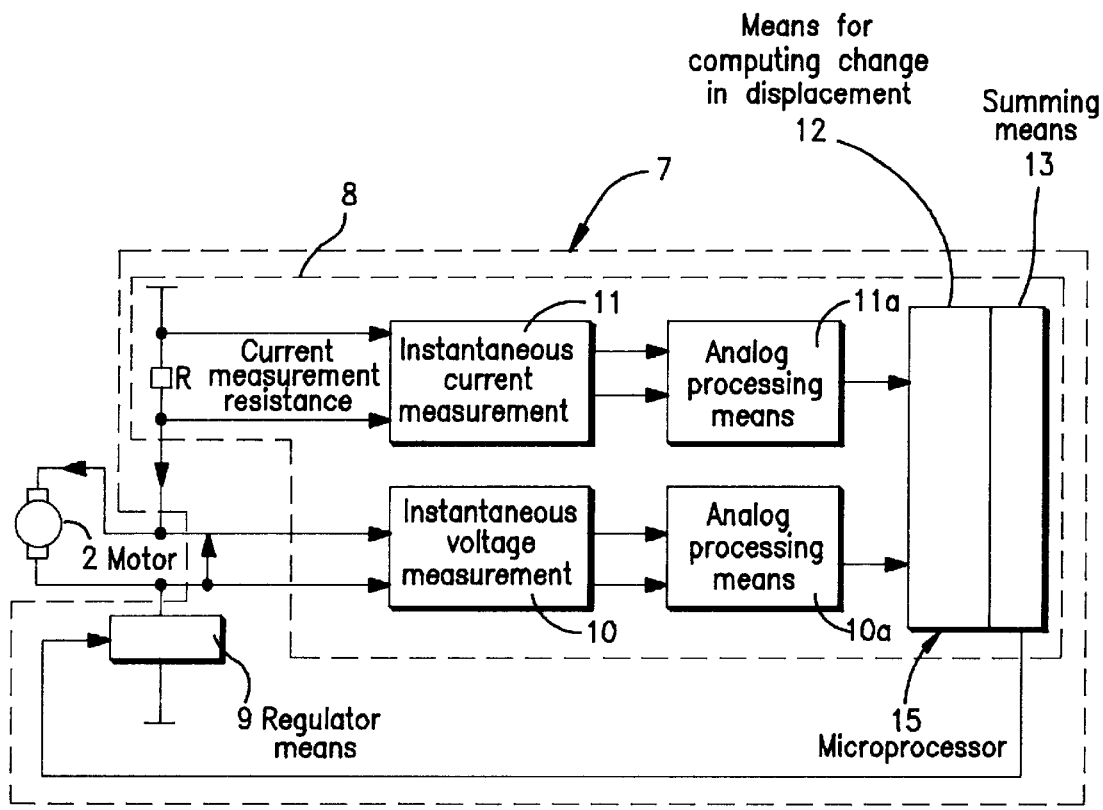
FIG. 3 is an electronic circuit diagram of the apparatus of FIG. 2.

In the embodiment shown in FIG. 1, the selected example is that of an electrically-controlled door for rail rolling stock of the Metro type, comprising a panel 3 made up of two leaves 4 suitable for moving along guide means 5 such as rails, for example, under drive from mechanical drive means 6 such as a screw-and-nut system 6a, 6b, driven by the motor 2, with the arrows shown in FIG. 1 corresponding to the displacement direction of the two leaves 4 of the door 1 relative to each other.

The method of the invention can also be applied to other types of door, such as car park doors in which a panel is displaced by rotation and not by transverse displacement as shown in FIG. 1, with the principles of control being the same.

In addition, it is clear that guide means 5 of types other than rails could be provided so long as they are adapted to the shape of the panels 3 of the door 1.

Finally, the mechanical drive means in this case comprise a screw-and-nut system 6a, 6b driven by the shaft of the motor 2, and connected to the leaves 4 so as to cause them to move. Naturally, other types of electromechanical actuator means of similar configuration could be provided.

According to the method of the invention, the electrical characteristics given by the motor 2 are used in order to determine the position of the door 1 at various instants during one complete opening or closing stroke of the door.

In the description below, a permanent magnet DC motor is used. Naturally, the invention could be applied to other types of DC motor by using the corresponding relationships.

Once the instantaneous position of the door has been determined, the voltage across the terminals of the DC motor 2 or the current flowing through the windings of the motor is regulated as a function of the determined instantaneous position. The above two operating steps are repeated at predetermined time intervals in order to control the displacement of the door 1.

Given the speed at which a door moves, an order of magnitude for a suitable time interval is a few milliseconds.

According to the invention, in order to determine the position of the door, use is made both of the instantaneous voltage across the terminals of the motor and of the instantaneous current flowing through the motor windings.

For a permanent magnet DC motor, the above voltage and current satisfy the following relationships:

$$U=E+R.I \text{ where } E=k_e.\omega \text{ and } C=k_c.I \qquad (1)$$

where:
U is the instantaneous mean voltage across the terminals of the motor (in volts);
E is the instantaneous back-emf (in volts);
R is the internal resistance of the motor (in ohms);
I is the instantaneous current flowing through the motor (in amps);
$k_e$ is the back-emf constant of the motor, which is known and supplied by the manufacturer (in volts/(radians per second));
$\omega$ is the speed of rotation of the motor shaft (in radians per second);
C is the torque delivered by the motor (in Newton.meters); and
$k_c$ is the torque coefficient of the motor which is known and given by the manufacturer (in Newton.meters per amp), $k_e=k_c$.

Thus, by computing at predetermined time intervals, it is possible to determine the displacement that the door will perform during each time interval as it occurs as a function of the instantaneous voltage and current values as measured and as a function of known and constant values for the back-emf and the internal resistance of the motor, as follows:

$$\Delta x = (a/k_e). E\Delta t \qquad (2)$$

where a is the ratio of the angular speed of rotation of the motor shaft to the linear displacement speed of the door, a being a constant, and where $\Delta t$ is the duration of the predetermined time interval.

It then suffices to add this displacement $\Delta x$ to the instantaneous position value determined during the preceding time interval to obtain the determined instantaneous position of the door at the end of the current time interval.

This time interval is then repeated until a door displacement is obtained that corresponds to one complete closing or opening stroke.

For greater safety, it can sometimes be necessary to apply process-specific settings to door displacement during the opening stroke or during the closing stroke.

For example, the process-specific settings may correspond to the door 1 moving in two stages:

1) the panel 3 is fully open and is set into high speed motion until it reaches an intermediate position which corresponds, for example, to the door being two-thirds closed; and
2) the panel 3 is driven at slow speed until the door 1 is completely closed, with its two leaves 4 being in contact one against the other.

Similarly, during the opening stroke, it is possible to provide the following two stages:

1) the panel 3 is fully closed and is set into motion at high speed until it reaches an intermediate position corresponding to the door being two-thirds open, for example; and
2) the panel 3 is driven at slow speed until the door is fully open.

Figure 4:
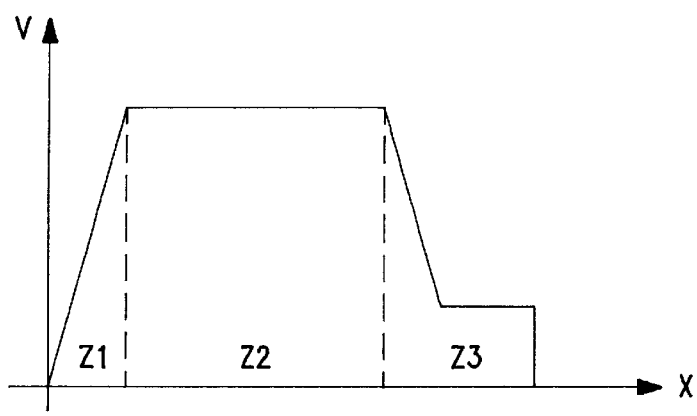
FIG. 4 is a graph having a curve of door displacement speed plotted as a function of determined instantaneous position, over one complete opening stroke.

A complete opening or closing stroke of the door 1 is thus defined by displacement zones Z1, Z2, and Z3 as shown in FIG. 4.

In the example shown, a first zone Z1 corresponds to an acceleration zone until high speed is reached, during which the motor delivers excess torque, a second zone Z2 corresponding to deceleration to constant speed during which the current corresponds to nominal current, and a third zone Z3 corresponding to a deceleration zone down to a low speed where the current is again nominal current once the door is at low speed.

To obtain a closing or opening stroke of this type, the value of the determined instantaneous position of the door 1 is compared with at least one predetermined value, the displacement zone presently occupied by the door is determined as a function of the result of said comparison, and the voltage across the terminals of the motor or the current flowing through the windings of the motor is regulated to a value corresponding to said displacement zone.

For example, if during determination of the instantaneous position of the door it is found that the door lies in zone Z2, then the voltage across the terminals of the motor is regulated so as to maintain the voltage that is already present across the terminals of the motor.

Also, although the parameter values for the internal resistance R of the motor and for the back-emf constant $k_e$ of the motor are given for each series of motors by the manufacturer, these values can vary, for example if the motor is a permanent magnet motor they can vary with the internal temperature of the motor, and they can also vary from one motor to another due to manufacturing tolerances.

To avoid errors in these parameter values, it is possible to provide for learning as a function of the various values measured or determined during a predetermined time interval, and particularly over a full opening or closing stroke.

For learning about the internal resistance of the motor R, the reference used is the motor when blocked. Under such circumstances, the current has a maximum value (maximum torque). The motor is under voltage, but its angular speed is zero. This gives:

$$R = U/I \quad (3)$$

since E=0
where U and I are known since they are measured.

The motor is thus kept in the blocked condition while under voltage for a certain length of time so as to be able to perform measurements, and in this way the internal resistance of the motor is determined at the end of each complete opening or closing stroke of the door 1. Thereafter each computed value is stored so as to be able to take an average, thus smoothing out computation error.

For learning the back-emf constant $k_e$ of the motor, the reference used is the full stroke of the door during an opening or closing stroke. On each occasion the door is opened or closed, the instantaneous position of the door is determined as is its stroke. Given that the maximum length of the stroke of the panel 3 of the door 1 is known, and written $X_0$, the following can be deduced:

$$k_e = (a/X_0) \int E \, dt \quad (4)$$

Using the integral as computed over the entire opening or closing stroke, the coefficient $k_e$ is computed.

For learning these two parameters R and $k_e$, it is possible to take as an initial default value the value given by the manufacturer. However it is also possible to provide for performing an extra opening or closing stroke so as to be able to define these values more accurately from the beginning.

To implement the method of the invention, control apparatus 7 is used that comprises:

means 8 for determining an instantaneous position of the door; and regulator means 19, for regulating the voltage across the terminals of the DC motor or for regulating the current flowing through the windings of the motor as a function of the determined instantaneous position.

The regulator means 9 comprise, for example, a voltage and current regulator circuit 9a, a circuit 9b for controlling the motor 2, and a circuit 9c for controlling the direction of rotation of the motor 2.

According to the invention, the means 8 for determining the instantaneous position comprise means 10 for measuring the instantaneous voltage across the terminals of the motor, means 11 for measuring the instantaneous current flowing through the windings of the motor, computation means 12 for computing the displacement performed by the door during the present time interval as a function of the measured instantaneous voltage and current values and as a function of known and constant values for the back-emf and for the internal resistance of the motor, and summing means 13 for adding said displacement to the value of the instantaneous position as determined during the preceding time interval so as to obtain the determined instantaneous position of the door at the end of the present time interval.

Current measurement is performed via a measurement resistance R connected in series with the motor, and the output signals from the measurement means 10 and 11 are processed conventionally by analog processing means 10a and 11a prior to being delivered to the microprocessor 15 that constitutes both the computation means 12 and the summing means 13.

To be able to implement the process specific characteristics described above, the control apparatus 7 further includes comparator means 16 for comparing the determined instantaneous position of the door with at least one predetermined value, means 17 responsive to the result of the comparison to determine a displacement zone in which the door is currently present, and regulator means 17a for regulating the voltage or the current passing through the windings of the motor to a value corresponding to said displacement zone.

The regulator means 17a can also serve to provide systematic regulation of the voltage across the terminals of the motor, or of the current flowing through them.

In addition, for learning R and $k_e$, the apparatus 7 includes first learning means 18b for learning the internal resistance of the motor as a function of the measured instantaneous voltage and current values, whenever the motor is in a blocked situation at the end of each opening or closing stroke, and second learning means 18a for learning the back-emf force constant of the motor as a function of the measured instantaneous voltage and current values of each time interval over a complete closing or opening stroke, and using the predetermined total stroke of the door.

Finally, the apparatus 7 further includes in conventional manner the following elements:

an input protection circuit 19;

an input processing circuit 19a;

a circuit 20 for management and for detecting obstacles on the path of the door; and a circuit 21 for processing outputs such as signalling and maintenance.

The invention also relates to a door 1 including apparatus 7 as described above, and more particularly in which the motor 2 is a permanent magnet DC motor.

I claim:

1. A method of electronically controlling displacement of a door using a DC motor, the method comprising the steps of:

determining an instantaneous position of the door at an end of a present time interval by measuring an instantaneous voltage across terminals of the motor, measuring an instantaneous current through windings of the motor, computing displacement of the door during the present time interval as a function of the measured instantaneous voltage, the measured instantaneous current, back-emf and internal resistance constants of the motor, and adding the computed displacement to an instantaneous position determined during a preceding time interval;

regulating one of voltage across the terminals of the motor and current through the windings of the motor as a function of the determined instantaneous position of the door; and repeating said determining and regulating steps at time intervals to control the displacement of the door.

2. The method according to claim 1, wherein said regulating step includes:

comparing the determined instantaneous position with at least one location, determining a displacement zone in which the door is presently located as a function of the comparison, and regulating one of the voltage and the current based on the displacement zone.

3. The method according to claim 1, wherein the DC motor is a permanent magnet motor, the method further comprising a step of determining the internal resistance constant of the motor by measuring instantaneous voltage and current values when the motor is blocked at an end of each one of an opening and a closing stroke of the door.

4. The method according to claim 1, wherein the DC motor is a permanent magnet motor, the method further comprising a step of determining the back-emf constant of the motor by measuring instantaneous voltage and current values for each time interval during a complete one of an opening and a closing stroke of the door.

5. An apparatus for electronically controlling displacement of a door using a DC motor, the apparatus comprising:

determining means for determining an instantaneous position of the door at an end of a present time interval, said determining means including means for measuring an instantaneous voltage across terminals of the motor, means for measuring an instantaneous current through windings of the motor, means for computing displacement of the door during the present time interval as a function of the measured instantaneous voltage, the measured instantaneous current, and back-emf and internal resistance constants of the motor, and summing means for adding the computed displacement to the instantaneous position determined during a preceding time interval; and regulating means for regulating one of voltage across the terminals of the motor and current through the windings of the motor as a function of the determined instantaneous position of the door.

6. The apparatus according to claim 5, wherein said regulating means includes:

means for comparing the instantaneous position of the door with at least one location, means for determining a displacement zone in which the door is presently located as a function of the comparison, and means for regulating one of the voltage and the current based on the determined displacement zone.

7. The apparatus according to claim 5, wherein the DC motor is a permanent magnet motor, the apparatus further comprising first learning means for determining the internal resistance constant of the motor as a function of measured instantaneous voltage and current values when the motor is blocked at an end of each one of an opening and a closing stroke of the door.

8. The apparatus according to claim 5, wherein the DC motor is a permanent magnet motor, the apparatus further comprising second learning means for determining the back-emf constant of the motor as a function of measured instantaneous voltage and current values for each time interval during a complete one of an opening and a closing stroke of the door.

9. An electronically controlled door comprising:

a door leaf;

guide means for guiding displacement of said door leaf;

mechanical drive means for displacing said leaf along said guide means by a DC motor;

determining means for determining an instantaneous position of the door leaf at an end of a present time interval, said determining means including means for measuring an instantaneous voltage across terminals of the motor, means for measuring an instantaneous current through windings of the motor, means for computing displacement of the door leaf during the present time interval as a function of the measured instantaneous voltage, the measured instantaneous current, and back-emf and internal resistance constants of the motor, and summing means for adding the computed displacement to the instantaneous position determined during a preceding time interval; and regulating means for regulating one of voltage across the terminal of the motor and current through the windings of the motor as a function of the determined instantaneous position of the door leaf.

10. The method according to claim 1, wherein the step of determining an instantaneous position of the door at the end of the present time interval is performed only by measuring an instantaneous voltage across terminals of the motor, measuring an instantaneous current through windings of the motor, computing displacement of the door during the present time interval as a function of the measured instantaneous voltage, the measured instantaneous current, the back-emf and internal resistance constants of the motor, and adding the computed displacement to an instantaneous position determined during the preceding time interval.

11. The apparatus according to claim 5, wherein said determining means for determining an instantaneous position of the door at the end of the present time interval, said determining means consists of said means for measuring an instantaneous voltage across terminals of the motor, means for measuring an instantaneous current through windings of the motor, said means for computing displacement of the door during the present time interval as a function of the measured instantaneous voltage, the measured instantaneous current, and the back-emf and internal resistance constants of the motor, and said summing means for adding the computed displacement to the instantaneous position determined during the preceding time interval.

* * * * *